Jan. 23, 1923.
A. S. BENT.
CONDUIT.
FILED OCT. 9, 1919.
1,443,162.
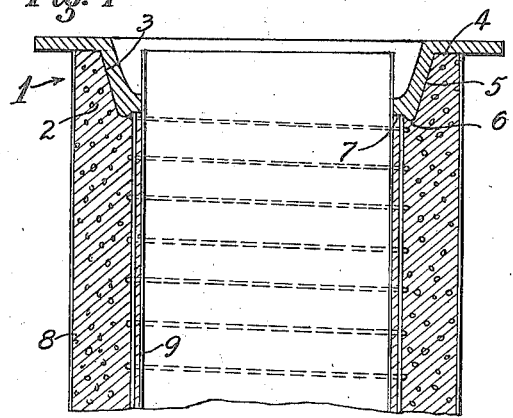
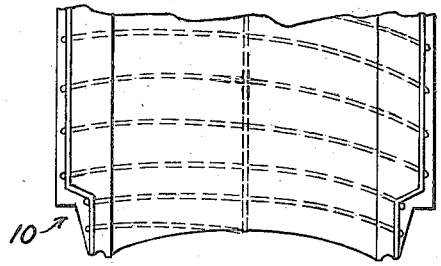
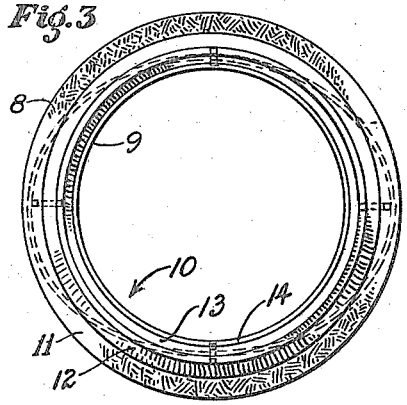
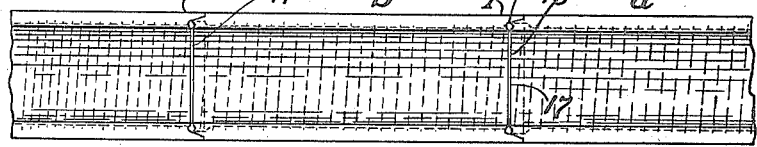
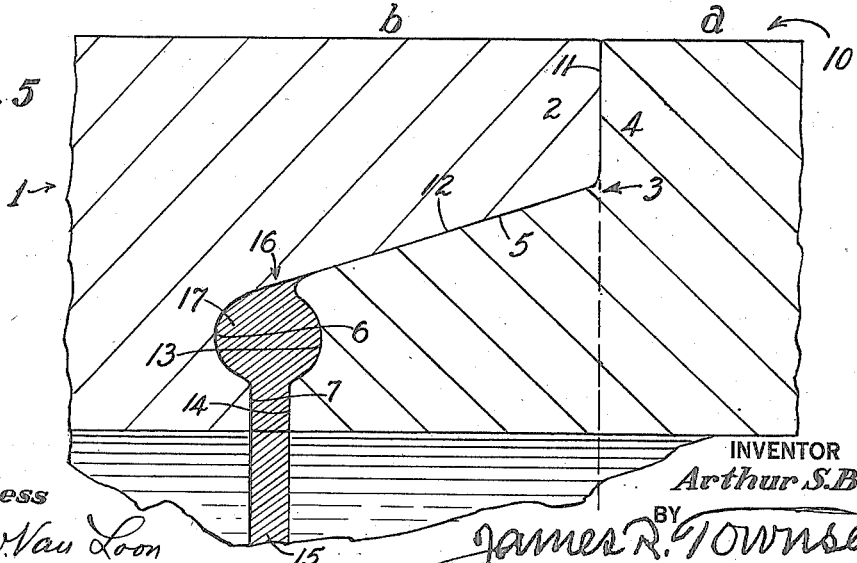
INVENTOR
Arthur S. Bent
BY James R. Townsend
ATTORNEY
Witness
A. W. Van Loon Patented Jan. 23, 1923.

1,443,162

UNITED STATES PATENT OFFICE.

ARTHUR S. BENT, OF LOS ANGELES, CALIFORNIA.

CONDUIT.

Application filed October 9, 1919. Serial No. 329,597.

*To all whom it may concern:*

Be it known that I, ARTHUR S. BENT, a citizen of the United States, residing at Los Angeles, in the county of Los Angeles and State of California, have invented a new and useful Conduit, of which the following is a specification.

This invention is more directly intended for the construction of re-inforced concrete pipe of diameter sufficient to give access to the interior thereof during the process of completion in situ. Such conduits are constructed in lengths or sections which are united at the time of laying the conduit, and this invention relates more particularly to the construction and the method of completing the joints and making them impervious to water or other fluids.

An object of the invention is to make provision whereby the seam of the joint is closed in the most advantageous manner, and whereby the effect of hydrostatic pressure on the joint is minimized and its tendency to rupture the joint is made negligible.

Another object is to enable the workmen and the inspectors to insure the perfection of the joint, because of its easy accessibility at all points.

Re-inforced concrete pipelines of considerable length are subject to three adverse conditions, each of which threatens the integrity of the connecting joints. One is the contraction of the pipeline itself due to its cooling under the soil when first covered. Another is the settlement of foundations which frequently occurs. Another is the drying out of the joint mortar which decreases its strength and value. It is obvious that all of these adverse conditions are at their maximum during the earliest stages of the construction of the line.

Under the methods of jointing heretofore used, it is necessary to do the jointing at the time the pipe is assembled in place and it is therefore not possible to guard against the above dangers. Under my novel method of jointing, the pipe can be assembled and completely covered with earth, and, without disadvantage, can be left for any desired length of time before the jointing is done; thus minimizing or entirely eliminating the above mentioned dangers.

Heretofore the joints of re-inforced concrete pipes have been sealed chiefly by external application and it has been customary to surround the joint with a shield encircling the pipe and forming an annular cavity and filling said cavity with cement mortar poured into the top of the annular space; this pouring or jointing being done at the time the pipe is assembled in the line.

By the former jointing method, as soon as the pipe is assembled, the shields are placed around the joint and held in place by earth backfilled against them, the greatest part of the circumference of the pipe being thereby covered and hidden by earth. It frequently happens that the shield, if made of paper, is accidentally broken, or, if made of metal, fails to fit snugly against the pipe. In either case openings are left through which the poured mortar escapes into the surrounding soil, thereby causing great waste, and failing to effect a perfect joint. Also lumps of earth or other unseen obstructions frequently get into the annular space and prevent the uniform flow of the mortar completely around and under the joint. Due to the earth covering, such defects and imperfect condition of joints are not readily discoverable until the water is turned into the line and leaks develop.

In other instances the inner walls of the joining sections are spaced apart to form a channel opening into the cavity of the pipe, and said channel is filled with cement which is retained by an inside band until the cement has set; after which the band, with some difficulty, is removed. In such latter case the walls of the channel formed to receive the cement are flat, and no method has been proposed whereby the cement surface subject to the hydrostatic pressure of the pipe can be reduced to a minimum and said cement made to support such pressure with a minimum tendency to break the pipe outwardly at the bell.

An object of the invention is to set aside all these difficulties, to avoid the necessity of using the bands, and to greatly reduce the amount of sealing material at each joint, and the labor of placing said sealing material.

The invention is broadly new, basic, pioneer and primary in that the bell and spigot ends of the joint are provided with annular recesses that register with each other to form an annular key shaped cavity to receive the mortar or other sealing material; said recesses being in faces that are transverse to the axis of the pipe and opening into the interior of the shell of the pipe when the joints are assembled, and being thereafter filled with the cementitious material. In this method the hydrostatic pressure of the liquid within the conduit is effective only at the inner surface of the pipe, while with previous construction, so far as I am aware, there has been a considerable space between the bell and spigot members of the joints wherein hydrostatic pressure becomes effective throughout a greater area, to rend the joint. In this joint the hydrostatic pressure and action of the water is only present on but a small portion of the seal and thereby reduces wear and pressure on the seal to a negligible extent.

An object is to provide a pipe end whose members are of such thickness as to afford maximum strength so as to avoid liability of breakage in handling the lengths before the same are laid.

Another object is to provide a joint in which any settlement cracks or shrinkage cracks that may occur after completion of the conduit, can be readily seen and repaired from inside the pipe alone.

The steel reinforcement in reinforced concrete pipe is frequently composed of spiral wire cages, spaced and held by longitudinal steel bars. When reinforcing for an outside or crushing load, these cages are placed elliptically in the shell of the concrete pipe.

With previous methods this elliptical cage had no positive seat on the bottom of the mold and was always liable to displacement which would destroy its value. In my improved method, the desired elliptical form can be secured by bending or off-setting the longitudinal bars, which are then held in that position by being seated in the depression or groove in the bottom mold. This establishes the reinforcement in the proper form and position, with minimum labor and attention.

The employment of this method is involved in the construction of the novel joint herein exemplified as will hereinafter more fully appear.

An object of the invention is to provide a conduit construction in which the sealing of the joints can be entirely accomplished by the direct use of a cement gun or other compressed air device and without the use of any shield or motar retainer aside from the conduit.

Other objects, advantages and features of invention may appear from the accompanying drawings, the subjoined detailed description and the appended claims.

The accompanying drawing illustrates the invention.

Figure 1 is a fragmental axial section of a conduit constructed in accordance with this invention.

Fig. 2 is a fragmental axial section of the conduit on line $x^2$ Fig. 1.

Fig. 3 is an end view of the spigot or male member of the joint in laid position.

Fig. 4 is a fragmental axial section of a conduit in laid position.

Fig. 5 is a full size fragmental detail of a completed joint.

The bell end 1 is provided with the external rim 2 within which is the annular cavity 3. Said bell end is formed in four annular faces 4, 5, 6, 7; the outer abutting face 4 extending transversely of the joint, the surface 5 being an annular truncated conical concavity, the surface 6 being an annular groove extending around the joint at the base of the rim 2, and the inner annular face 7 being in stepped relation to the annular outer face 4 and groove 6; the bottom of the groove 6 being further removed from the terminal or outer face 4 of the rim 2, than the face 7.

The pipe sections are preferably molded or cast between sheet metal cylindrical forms or shells 8, 9.

The spigot end 10 of the joint is constructed with the outer annular face 11 extending transversely of the joint and complementary to the outer annular bell face 4. Inside said annular face 11 is the truncated conical insert 12 that fits the conical cavity formed by face 5. The end of said spigot is provided with a groove 13 corresponding to and opposing the groove 6 in the bell, and is also provided with an annular inner face 14 corresponding to and opposing the annular inner face 7.

The length of the conical insert 12 of the spigot is less than the depth of the truncated conical cavity formed by the face 5, so that when the spigot end of one section $a$ of the conduit is joined to the bell end of another section $b$ as indented in Figs. 3 and 4 there will be an inner annular channel 15 between the inner annular faces 7 and 14, leading to an annular chamber 16 formed by the grooves 6 and 13.

17 indicates the seal made of some cementitious material compressed into the annular cavity formed at 6 and 13 after the pipe has been assembled in place. The contour of the seal gives a maximum locking effect and bonding surface to the joint. The seal 17 may be of Portland cement mortar or any other suitable cementitious plastic material shot into the cavity by a cement gun or placed in the position shown by any other suitable means.

In practice the pipe sections or lengths will be manufactured in the usual way excepting that the spigot and bell will be formed as indicated in the drawing.

When the sections are well cured and the ditch or the other bed for the conduit has been prepared, the sections will be laid in place and the joints assembled as may be requisite for the special work in hand.

When, after the conduit has been fully settled in its bed either near to or long subsequent to the time of assembling the pipe, it is desired to complete the same, the workmen will go inside the pipe and will fill the cavity at 15 and 16 with the cementitious body 17, which, at the time of this final operation is sufficiently stiff to maintain its place in the cavity; thus sealing the joint.

The cementitious seal is then allowed to harden and the water may then be turned into the pipe.

When this is finally effected, access to the space between the ends of the abutting sections or lengths is closed from the inside of the pipe and the joint outside of the inner cementitious seal 17 is open externally thus guarding against any hydrostatic pressure which would tend to burst the joint in case of seepage into the space between the circumference of the spigot and the inside of the seat therefor.

The joint may be made by forcing mortar peripherally into the annular space between the bell and spigot ends of the pipe by the use of a cement gun or other compressed air appliance.

In cases where the conduit is to be reinforced for internal water pressure the reinforcing cage is then cylindrical and should be as near the outside of the shell of the concrete pipe as possible. The groove in the mold for casting the bottom end of the pipe forms a seat for the longitudinal bars of the reinforcement and holds the cage firmly in the desired form and position.

I claim:

1. A conduit comprising a plurality of pipe sections, each section having spigot and bell ends provided with annular grooves; the groove of the spigot end of one section being complementary to the groove of the bell end of a complementary pipe section and said complementary grooves being adapted to give a key form to a cementing mortar forced thereinto for the purpose of giving the maximum locking effect and also maximum bonding surface between the mortar and the pipe; there being an annular channel extending from said complementary grooves to the inside of the pipe and through which said mortar is forced to the complementary grooves.

2. A conduit comprising a plurality of complementary pipe sections, each section having a spigot provided in its end with an annular groove, and each section having a bell end forming a slot for the spigot of a complementary pipe section and provided in its end with an annular groove complementary to the groove in said spigot, the abutting ends of the bell and spigot being formed with an outer and inner annular face and a groove between said inner annular faces, the inner annular faces of such section being in stepped relation to the groove and the outer annular face of such section to form an opening into the cavity formed by the complementary grooves, thus providing a contracted mouth through which plastic material may be forced to form a seal within the cavity formed by the complementary grooves.

In testimony whereof, I have hereunto set my hand at Los Angeles, California, this 19th day of September, 1919.

ARTHUR S. BENT.

Witness:
JAMES R. TOWNSEND.